H. L. TANNER.
GYROSCOPIC PENDULUM FOR AEROPLANES, TORPEDOES, AND THE LIKE.
APPLICATION FILED MAY 26, 1916.

1,312,086.  
Patented Aug. 5, 1919.

INVENTOR.  
HARRY L TANNER.  
BY Herbert H. Thompson,  
ATTORNEY.

UNITED STATES PATENT OFFICE.

HARRY L. TANNER, OF BROOKLYN, NEW YORK, ASSIGNOR TO SPERRY GYROSCOPE COMPANY, OF BROOKLYN, NEW YORK, A CORPORATION OF NEW YORK.

GYROSCOPIC PENDULUM FOR AEROPLANES, TORPEDOES, AND THE LIKE.

1,312,086. Specification of Letters Patent. Patented Aug. 5, 1919.

Application filed May 26, 1916. Serial No. 100,148.

*To all whom it may concern:*

Be it known that I, HARRY L. TANNER, a citizen of the United States of America, residing at borough of Brooklyn, New York city, in the county of Kings and State of New York, have invented certain new and useful Improvements in Gyroscopic Pendulums for Aeroplanes, Torpedoes, and the like, of which the following is a specification.

This invention relates to gyroscopic pendulums designed for use on moving vehicles, especially aeroplanes and the like which have freedom of motion in all three planes. Various types of gyroscopic pendulums have been tried on aeroplanes but up to the present time all such devices have proved failures except where a plurality of coupled gyroscopes are employed in combination with complicated electrical devices for applying torques about the axes of the gyroscopes to counteract acceleration pressures. The use of a single gyroscope spinning upon a vertical axis has long since been abandoned, since prior workers found it impossible to maintain a gyroscope in its original position during a flight of any duration. The gyroscope would generally turn up side down every time the aeroplane changed its course. After many exhaustive experiments I have devised a simple method of preventing all of these troubles, whereby a single gyroscope spinning on a vertical axis is made to perform all of the functions for which it was heretofore considered necessary to employ a complicated multiple gyroscope system.

Figure 1:
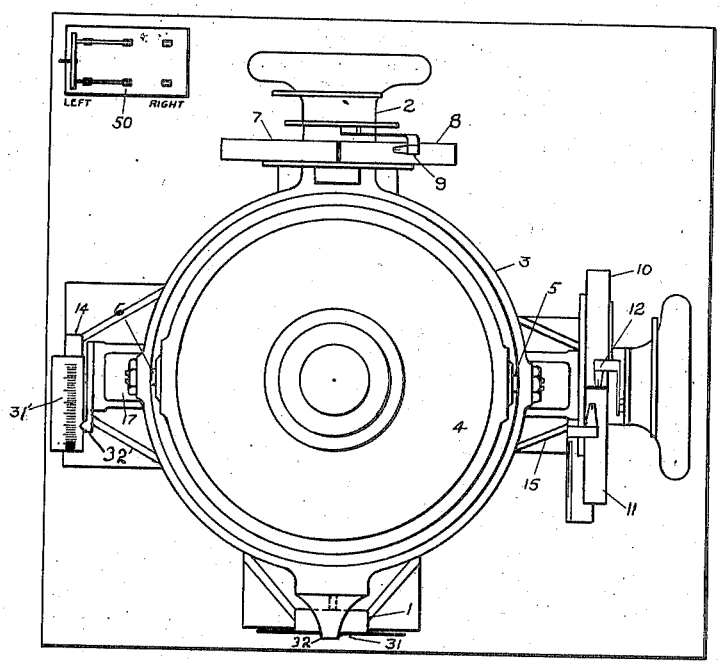
Figure 2:
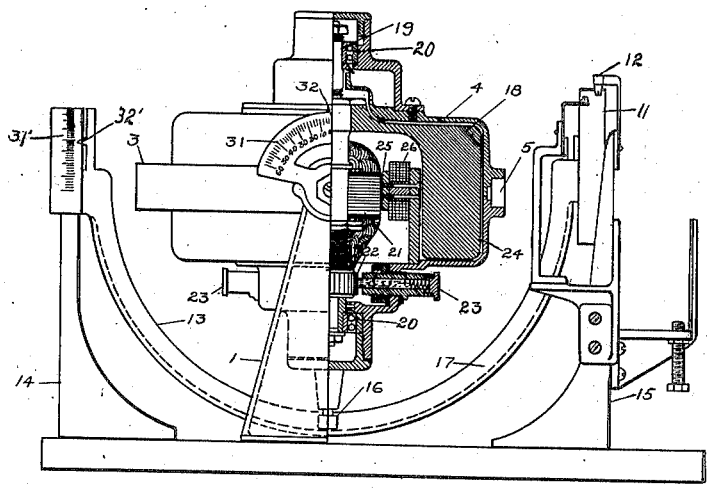

Referring to the drawings in which what I now consider to be the preferred form of my invention is shown: Figure 1 is a plan view of a gyroscope designed according to my invention. Fig. 2 is an elevation thereof partly in section. The gyroscope is shown as supported from brackets 1 and 2 by means of a gimbal ring 3, in which the casing 4 of the rotor is journaled at 5, 6. A system of contacts 7, 8 with a coöperating brush 9 therefor is mounted on the gimbal ring 3 for controlling the aeroplane about one axis, while a corresponding system of contacts and brushes 10, 11, 12 is mounted on the swinging loop 13 pivoted on brackets 14 and 15 about an axis at right angles to the axis of ring 3. The rotor casing 4 is connected to said loop by means of a roller 16 which engages a trough 17 in the top of the loop. The gyroscope is also preferably equipped with indicating means 31, 32 31', 32' adapted to show the inclination of the aeroplane. The rotor 18 is preferably electrically driven, the motor being built in as a part of the rotor so that a very compact structure is secured. The motor is entirely inclosed by the case and is shown as of the direct current type. It is constructed in a novel manner in order to secure a maximum gyroscopic effect with a minimum weight and size. The shaft 19 is shown as mounted in ballbearings 20 at the top and bottom of the casing. The armature, commutator and brushes are shown at 21, 22 and 23 respectively. Also secured to said armature shaft is a heavy fly wheel which forms the rotor 18. This fly wheel is secured to the armature shaft near its top, while the heavy rim 24 projects downwardly and completely incloses the armature. Within the hollow recess of the fly wheel are also mounted the pole pieces 25 and field coils 26. The pole pieces are preferably placed slightly above the center of the armature so that a large portion of the end thrust due to the weight of the rotor will be taken off the bearings, when the gyroscope is running.

The most important feature in the design, however, is the relationship that I have found should exist between the natural period of oscillation of the gyroscopic pendulum and the usual period in which the aeroplane is turned through 360°.

While the time in which an aeroplane may be turned through 360° varies with the radius of the turn, it is well recognized that aviators become accustomed to turning in about the same radius, *i. e.* the radius which seems to suit the individual machine the best. It is this average or usual period of turning that is referred to particularly herein, although the period of oscillation of the gyro-pendulum is so many times greater than this usual period of turning as to be greater than the time taken to turn under all ordinary conditions with all types of aeroplanes.

I have found that by designing the gyroscope so that its natural period of oscillation is much in excess of, preferably many times, the usual period of time in which the aeroplane is turned, the deviation of the pendulum from the vertical position due to acceleration pressures can be reduced to such a low figure as to be practically negligible. This result is secured by so designing the speed and moment of inertia of the rotor with respect to the pendulous factor or ballistic properties of the gyroscope about its axes of support that a very long natural period of oscillation is secured.

The relation between the period of oscillation and the other properties of a gyroscopic pendulum may be expressed in the following equation:

$$P = \frac{2\pi I r}{Mgl}$$

where P equals the period in seconds; M, the mass of the suspended portions of the gyroscope; $g$, the acceleration of gravity; $l$, the distance of the center of gravity of the gyroscope below the point of suspension; I, the moment of inertia of the rotor, and $r$, the speed of rotation of the rotor. The condition which must be present according to my invention may then be expressed in the following equation, where T equals the average time in which the aeroplane is turned through 360°

$$T < \frac{2\pi I r}{Mgl}$$

I have also found when the gyroscope is rotating in the same direction that the aeroplane is turning that the deviation due to acceleration pressures is very much less than when the gyroscope is rotating in the opposite direction. I also find that there is a much greater tendency of the gyroscope to turn completely over under the latter conditions. It is well known that each aviator has a preferred direction in which to turn his machine. I therefore make use of a reversing switch 50 which may be used to rotate the gyroscope in the direction in which the particular aviator generally turns.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The combination with a vehicle capable of turning, of a gyroscopic pendulum mounted thereon having a natural period of oscillation in excess of the period in which the vehicle will be turned.

2. The combination with a vehicle capable of turning in known periods, of a stabilizing gyroscope therefor comprising a universally mounted rotor bearing frame, which together with its contained parts has a predetermined pendulous factor, a motor driven rotor of predetermined moment of inertia mounted on a normally vertical spinning axis in said frame, said rotor being adapted to be driven at a predetermined speed, the said factors being such that the period of oscillation of the gyroscopic pendulum is in excess of the usual maximum period of turning of the vehicle.

3. The combination with a vehicle capable of turning, of a gyroscope mounted thereon with a normally vertical spinning axis and means whereby the direction of spin of said gyroscope may be made to correspond to the direction in which the vehicle turns.

4. The combination of an aeroplane and gyroscopic pendulum having the relation expressed by the equation $$T < \frac{2\pi r I}{Mgl}$$

In testimony whereof I have affixed my signature.

HARRY L. TANNER.